Nov. 17, 1942.   S. B. PICKLES   2,302,143
HIGH FREQUENCY VOLTMETER
Filed Sept. 19, 1939
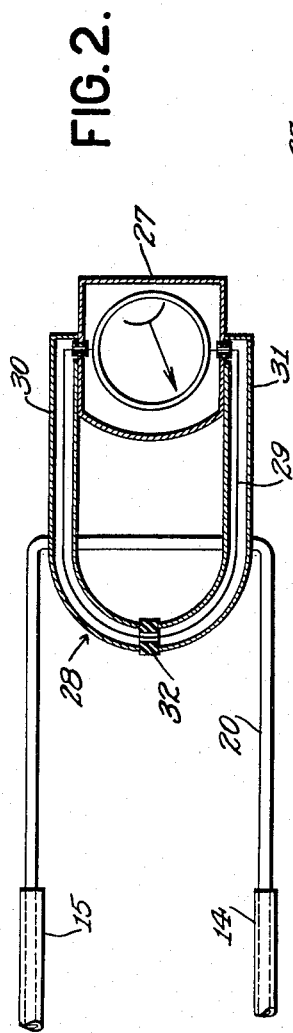
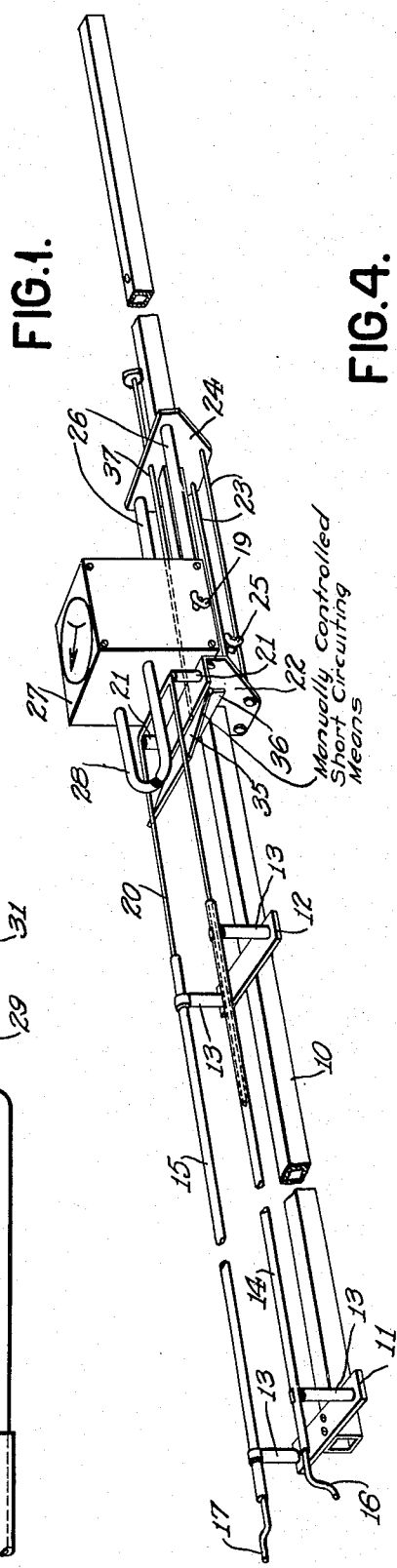
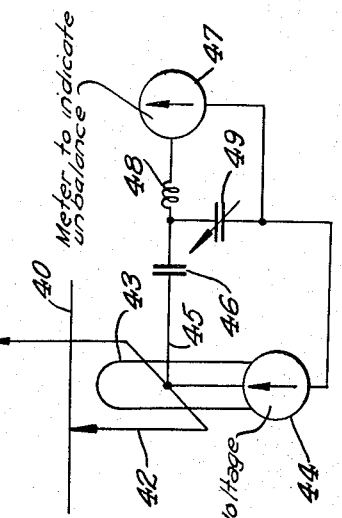
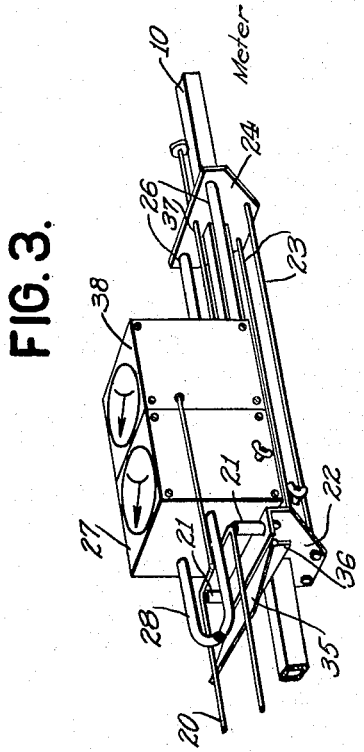
INVENTOR
SIDNEY B. PICKLES
BY
Ed Phinney
ATTORNEY Patented Nov. 17, 1942

2,302,143

UNITED STATES PATENT OFFICE 2,302,143

HIGH FREQUENCY VOLTMETER

Sidney B. Pickles, Indianapolis, Ind., assignor to International Telephone & Radio Manufacturing Corporation, a corporation of Delaware Application September 19, 1939, Serial No. 295,600

7 Claims. (Cl. 171—95)

My invention relates to high frequency measuring arrangements, and more particularly to instruments for measuring voltage and/or detecting the presence of unbalanced voltages or currents in a high frequency transmission line.

When voltage measurements at high radio frequencies are desired, these measurements are generally made by reading the currents as the current reading is more easily obtained and the voltage current relation is well known. However, measurements of voltages at the high radio frequencies are difficult to accurately obtain since any instrument applied across the line for measuring the current causes a disturbance in the distribution of waves in the line, and produces an incorrect indication. This disturbing effect is particularly troublesome in the ultra high frequency range, that is, at frequencies above 10 megacycles.

Furthermore, it is often desired to use a transmission line which is balanced with respect to ground, that is, a line in which the currents are in opposed phase relation on the two sides of the line. In order to ascertain when a line is balanced, it is necessary to be able to detect any longitudinal components of the wave in the line. Such longitudinal components comprise the portions of the energy which are not in phase opposition and therefore flow along the two conductors of the line in the same direction. For making these measurements it is desirable that the instruments be associated with the line in such a manner as to cause no disturbing effect of the balanced current in the line itself.

It is a principal object of my invention to provide an instrument for measuring the voltage in a balanced transmission line or detecting unbalanced currents in the line without producing disturbing reflections in the transmission line.

According to one feature of my invention I provide a transmission line section, short circuited at one end which may be bridged across the transmission line upon which measurements are to be made without causing disturbance of the balanced wave energy in the line and coupled thereto a meter for determining the voltage across the line, or for detecting the unbalanced current in the line.

Such a circuit should preferably be arranged so that the meter intended for measuring the voltage has no electrostatic coupling with the line section, and it is an object of my invention to provide means for shielding the voltage measuring meter coupling circuit so as to prevent such electrostatic coupling. This shielding may be accomplished according to a feature of my invention by providing around the coil whereby the meter is coupled to the transmission line section an interrupted shielding member connected to the metallic casing of the meter.

This shield then assures that substantially only the electromagnetic coupling will exist between the coil and the transmission line section.

According to another feature of my invention a thermoammeter may be coupled to the midpoint of the short circuiting bar of the transmission line section, to indicate the presence of longitudinal displacement currents therein. Both the voltage indicating meter and the longitudinal current detecting meter may be mounted on the same instrument on a slidable rack, so that the voltage coupling may be varied. Furthermore, the transmission line section may be provided in the form of a trombone slide so that it may be tuned to different frequencies. The tip portion of the transmission line may also be arranged rotatably on the end of the rod and offset so that transmission lines with different spacings may be measured with the same instrument.

Other objects and features of my invention will be obvious from the particular description thereof made in connection with the accompanying drawing, in which Fig. 1 is a perspective view of one form of instrument in accordance with my invention for measuring line voltages;

Fig. 2 is a detailed drawing illustrating in cross section the shielding arrangement for the meter coupling loop;

Fig. 3 is a fragmentary view of a portion of the measuring instrument provided with two meters for measuring the balanced voltage and detecting the longitudinal displacement currents, and Fig. 4 is a schematic wiring diagram indicating the electrical circuit for coupling the meter.

Turning now to Fig. 1, 10 indicates a supporting rod preferably made of metal and made light in weight. This may be accomplished by utilizing aluminum for this rod. The rod 10 is preferably made of some form other than circular so that elements may be moved longitudinally therealong without rotation and is preferably hollow to reduce its weight. Fastened at spaced points on supporting rod 10, are fixed plates 11, 12, preferably made of metal for strength, and arranged in upright relation on these plates are provided insulators 13 on which are fastened tubular conductors 14, 15. On one end of rods 14, 15 are provided test prod connectors 16, 17, preferably provided with an offset portion so that by rotating these connectors a variable spacing between the ends thereof is accomplished. Telescopically disposed within conductors 14 and 15 is a U-shaped conductor 20, the U-shaped short circuiting end of which is mounted on insulators 21 supported on plate 22.

Plate 22 is slidably arranged on supporting member 10 and is rigidly fastened by rods 23 to a further plate 24 slidably mounted on supporting rod 10 so that the whole structure forms a carriage movable with respect to the fixed conductors 14, 15. By adjusting the position of the carriage the length of the transmission line section including conductors 14, 15 and 20 may be varied to tune the arrangement to the proper frequency. A means such as a thumb screw 25 is provided to hold the carriage in adjusted position once the desired tuning has been effected.

A further pair of rods 26 are mounted between plates 22, 24 and slidably supported on these rods is a meter 27. This meter is preferably of the type having low resistance and high current capacity such as an ammeter, and may be of the kind known as the thermocouple milliammeter. For coupling meter 27 with the transmission line section 20, a simple loop arrangement 28 is provided. Loop 28 is constructed preferably as shown in Fig. 2, and comprises a central conductor 29 around which is provided a metallic screening shield 30, 31 made in two sections and directly connected to the metallic casing of meter 27. At the interrupted point of the shield an insulator 32 is provided. This interruption in the shield prevents the shield from forming a short circuiting shield about the inner conductor for electro-magnetic waves but since the shield covers substantially the whole loop, it prevents electrostatic coupling between 20 and 28, while still permitting electromagnetic coupling.

Meter 27 is slidably arranged on rods 26 so as to vary the degree of coupling between 28 and 20 and is retained in adjusted position by thumb screw 19. The coupling between 28 and 20 is preferably made very loose and then any adjustment due to changing of the meter coupling causes very little effect on the tuning of the quarter wave line section.

In making readings it is generally desirable to provide an arrangement which prevents the meter from being subjected to the complete voltage except at the time during which readings are being made. In order to protect the meter, I provide a plate 35 hinged on plate 22 and provided with a downwardly extending vane 36. Slidably mounted in plates 22, 24 of the carriage, I provide a rod 37. When rod 37 is pushed forward it presses against vane 36 rocking plate 35 into contact with the conductors 20, providing an effective short circuit at a point beyond the end of coupling coil 28. When it is desired to take a reading rod 37 is withdrawn permitting plate 35 to drop by gravity away from the transmission line section, so that readings may be made.

It is often desirable in connection with the voltmeter to have a meter for indicating the presence of longitudinal current on the transmission line. A structural arrangement for accomplishing this result in accordance with my invention is illustrated in Fig. 3. In this figure, the same structural elements as those shown in Fig. 1, are designated by similar reference characters. However, the arrangement is modified by making the carriage so that the space between plates 22 and 24 is longer for mounting a larger meter having two indicating portions 27 and 38 thereon. Meter 33 is electrically coupled to the midpoint of the short circuiting end of conductor 20.

A better understanding of the arrangement may be had by reference to Fig. 4, wherein 40, 41 indicate the conductors of a transmission line upon which measurements are to be taken. A short circuited quarter wavelength transmission line 42 is bridged across the transmission line and coupled thereto by means of loop 43 is an ammeter 44. At the midpoint of the quarter wave section 42 is connected a conductor 45 coupled loosely preferably through a coupling condenser 46 with a series circuit including meter 47, inductance 48 and variable condenser 49. The series circuit 47, 48, 49 is preferably tuned to resonance at the frequency of the longitudinal wave to be detected to provide sufficient sensitivity for the meter 47. Meters 47 and 44 are preferably provided with metallic casings which are interconnected so as to form the circuit shown.

Since, for the longitudinal components in lines 40, 41, section 42 does not act like a short circuited quarter wavelength line, these longitudinal currents coming down over 42, traverse conductor 45 to the tuned circuit associated with meter 47. By making measurements at several points along the line an indication of the presence of longitudnal components may be perceived. Since for the balanced or loop waves, section 42 presents substantially infinite impedance, no disturbance of these balanced waves will be produced while taking measurements of the longitudinal components. Section 42, however, will act substantially like an open ended quarter wave section of transmission line so far as longitudinal currents are concerned. The additional effect of the line circuit 45 and the coupled meter, will have the effect of somewhat detuning section 42 from an open circuited quarter wavelength for the longitudinal waves, so that a complete reflection of these waves is not caused at this point in the line. Since generally it is not necessary to measure the absolute magnitude of longitudinal currents but merely to detect their presence so that the line may be adjusted to remove them therefrom, it is not necessary to provide for complete elimination of line disturbances for the longitudinal currents in the meter.

Although I have shown an arrangement wherein both the voltage indicating meter and the longitudinal current detecting meter are mounted in a single instrument, it is clear that the instrument may be constructed to produce indications of longitudinal currents only, similar to the voltage measuring arrangement shown in Fig. 1. Likewise, various other arangements of the system may be made.

While I have described a preferred form of my invention in connection with the accompanying drawing, it should be understood that this is merely an illustration thereof and not an indication of the scope of my invention. Various modifications may be made therein by those skilled in the art within the scope of the accompanying claims.

What I claim is:

1. A high frequency measuring instrument comprising a frame, a U-shaped conductor of adjustable length mounted on said frame, the open end of said U-shaped conductor extending beyond one end of said frame, a meter having an input circuit, mounted on said frame, and means for coupling the input of said meter with said U-shaped conductor substantially at the closed end thereof.

2. A high frequency measuring instrument according to claim 1, further comprising offset rotatable conductor portions rotatably mounted in the open ends of said U-shaped conductor, whereby the instrument is adapted to be bridged across transmission lines of different spacings.

3. A high frequency measuring instrument according to claim 1, wherein said meter is provided with a metallic casing, said coupling means comprising a conductor loop connected to said meter, and an electrostatic shield electrically broken at one point therealong about said loop connected to said casing, said loop being spaced from said U-shaped conductor.

4. A high frequency measuring instrument according to claim 1, wherein said coupling means comprises a coupling conductor connected at one end to the midpoint of said U-shaped section, a series tuned circuit comprising an inductance and a capacity connected to said meter, and a connection between the other end of said coupling conductor and said tuned circuit.

5. A high frequency measuring instrument for obtaining a measurement of the electromagnetic component of a current, comprising a metal encased meter, an inductive loop connected to said meter for receiving induced currents to be measured, and an electrostatic shield about said loop comprising metallic members galvanically connected to said casing, said members being separated from each other at one end by a small spacing whereby electrostatic coupling is substantially eliminated without interfering with the electro-magnetic coupling.

6. A high frequency measuring instrument, comprising a two conductor system effectively a quarter of a wave length long at the frequency to be measured, the conductor being open-circuited at one end for connection to a transmission line and connected together at their other end, and a high frequency responsive measuring instrument comprising a milliammeter coupled inductively to the interconncted end of said two conductor system.

7. A high frequency measuring instrument, comprising a two conductor system effectively a quarter of a wave length long at the frequency to be measured, the conductors being open-circuited at one end for connection to a transmission line and connected together at their other end, and a high frequency responsive measuring instrument comprising a milliammeter electrically connected to the mid-point of said two conductor inter-connection.

SIDNEY B. PICKLES.